United States Patent
Yarbrough et al.

(10) Patent No.: US 11,572,861 B2
(45) Date of Patent: Feb. 7, 2023

(54) METHOD FOR FORMING A ROTOR BLADE FOR A WIND TURBINE

(71) Applicant: General Electric Company, Schenectady, NY (US)

(72) Inventors: Aaron A. Yarbrough, Greenville, SC (US); Christopher Daniel Caruso, Greenville, SC (US); Jamie T. Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 668 days.

(21) Appl. No.: 15/420,428

(22) Filed: Jan. 31, 2017

(65) Prior Publication Data
US 2018/0216601 A1    Aug. 2, 2018

(51) Int. Cl.
| | |
|---|---|
| *F03D 1/06* | (2006.01) |
| *B29C 70/02* | (2006.01) |
| *B29C 70/68* | (2006.01) |
| *B29C 70/78* | (2006.01) |
| *B29L 31/08* | (2006.01) |

(52) U.S. Cl.
CPC .......... *F03D 1/0675* (2013.01); *B29C 70/023* (2013.01); *B29C 70/682* (2013.01); *B29C 70/78* (2013.01); *B29L 2031/085* (2013.01); *F05B 2230/20* (2013.01); *F05B 2230/30* (2013.01); *F05B 2280/6003* (2013.01); *F05B 2280/6015* (2013.01); *Y02E 10/72* (2013.01)

(58) Field of Classification Search
CPC .............................. F03D 1/0675; B29C 70/78
See application file for complete search history.

(56) References Cited

U.S. PATENT DOCUMENTS

| | | | |
|---|---|---|---|
| 5,439,635 A * | 8/1995 | Seemann | ............ B29C 33/0066 264/154 |
| 7,393,184 B2 | 7/2008 | Cairo | |
| 8,262,360 B2 | 9/2012 | Whiley et al. | |
| 8,425,195 B2 | 4/2013 | Rudling | |
| 8,696,317 B2 | 4/2014 | Rudling | |
| 8,764,401 B2 | 7/2014 | Hayden et al. | |
| 8,905,718 B2 | 12/2014 | Hayden et al. | |
| 9,133,818 B2 | 9/2015 | Hayden et al. | |

(Continued)

FOREIGN PATENT DOCUMENTS

| | | |
|---|---|---|
| EP | 3124785 A1 | 2/2017 |
| KR | 20-2014-0003596 | 6/2014 |

OTHER PUBLICATIONS

International Search Report and Written Opinion of the International Searching Authority, International Application No. PCT/US2018/030081, dated Jan. 30, 2019, 11 pages.

(Continued)

*Primary Examiner* — Liam J Heincer
(74) *Attorney, Agent, or Firm* — Dority & Manning, P.A.

(57) ABSTRACT

The present disclosure is directed to a method for forming a wind turbine rotor blade. The method includes placing first and second prefabricated skin panels defining a portion of a root section of the wind turbine rotor blade, a pressure side of the wind turbine rotor blade, or a suction side of the wind turbine rotor blade in a mold. The first and second prefabricated skin panels partially overlap to define a connection region. A vacuum bag is placed over the mold. The connection region is infused with a resin.

19 Claims, 9 Drawing Sheets

(56) References Cited

U.S. PATENT DOCUMENTS

| | | | |
|---|---|---|---|
| 9,290,941 B2 | 3/2016 | Hayden et al. | |
| 2006/0034971 A1* | 2/2006 | Olsen | B29C 33/26 425/451.5 |
| 2007/0107220 A1* | 5/2007 | Bakhuis | B29C 70/086 29/889.7 |
| 2008/0075603 A1* | 3/2008 | Van Breugel | B29C 65/542 416/232 |
| 2008/0206059 A1* | 8/2008 | Hancock | F03D 1/0658 416/213 R |
| 2009/0246033 A1 | 10/2009 | Rudling | |
| 2010/0028161 A1 | 2/2010 | Vronsky et al. | |
| 2010/0084079 A1 | 4/2010 | Hayden et al. | |
| 2011/0021737 A1* | 1/2011 | Tadepalli | B29C 70/36 528/26 |
| 2011/0097211 A1 | 4/2011 | Rudling | |
| 2011/0142679 A1 | 6/2011 | Bendel et al. | |
| 2011/0229336 A1* | 9/2011 | Richter | B29C 65/5014 416/226 |
| 2012/0091627 A1* | 4/2012 | Schibsbye | B29C 70/443 264/258 |
| 2012/0294724 A1 | 11/2012 | Broome et al. | |
| 2013/0189114 A1* | 7/2013 | Jenzewski | B29C 70/443 416/229 R |
| 2013/0209264 A1 | 8/2013 | Mashue et al. | |
| 2013/0327220 A1* | 12/2013 | De Mulatier | B29C 70/44 96/12 |
| 2014/0064980 A1* | 3/2014 | Griesel | F03D 1/0675 416/226 |
| 2014/0086752 A1 | 3/2014 | Hayden et al. | |
| 2014/0234109 A1 | 8/2014 | Hayden et al. | |
| 2015/0010405 A1* | 1/2015 | De Waal Malefijt | B29C 31/00 416/229 R |
| 2015/0056081 A1* | 2/2015 | De Waal Malefijt | B29C 31/00 416/241 R |
| 2015/0159635 A1 | 6/2015 | Hayden et al. | |
| 2015/0167633 A1* | 6/2015 | Tobin | F03D 1/0675 416/229 R |
| 2015/0198051 A1 | 7/2015 | Hayden et al. | |
| 2015/0198141 A1 | 7/2015 | Hayden et al. | |
| 2016/0146187 A1 | 5/2016 | Hayden et al. | |
| 2016/0215757 A1 | 7/2016 | Behmer et al. | |
| 2016/0279867 A1* | 9/2016 | Garm | B29C 66/54 |
| 2016/0281680 A1* | 9/2016 | Randall | F03D 1/0683 |
| 2016/0319801 A1* | 11/2016 | Smith | B29C 70/44 |
| 2016/0346965 A1* | 12/2016 | Hayden | B29C 66/5268 |
| 2016/0348642 A1 | 12/2016 | Hayden et al. | |
| 2017/0058865 A1* | 3/2017 | Caruso | F03D 1/0675 |
| 2017/0067439 A1* | 3/2017 | Yarbrough | F03D 1/0675 |
| 2017/0082087 A1* | 3/2017 | Yarbrough | F03D 1/0675 |
| 2017/0082089 A1* | 3/2017 | Yarbrough | F03D 1/0675 |
| 2017/0121877 A1* | 5/2017 | Ramachandran | F03D 1/0675 |
| 2017/0218918 A1* | 8/2017 | Cieslak | B32B 5/024 |
| 2018/0058422 A1* | 3/2018 | Yarbrough | F03D 1/0675 |

OTHER PUBLICATIONS

Supplementary European Search Report for EP application No. 18917228.1, dated Nov. 15, 2021.

* cited by examiner

METHOD FOR FORMING A ROTOR BLADE FOR A WIND TURBINE

FIELD OF THE TECHNOLOGY

The present disclosure generally relates to wind turbines. More particularly, the present disclosure relates to methods of forming rotor blades for wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A shaft transmits the mechanical energy from the rotor blades to the generator. The generator then converts the mechanical energy to electrical energy that may be supplied to a utility grid.

Each rotor blade is generally formed from a plurality of shell portions that are bonded together to form the exterior aerodynamic shape of the rotor blade. In this respect, the shell portions define the skin of the rotor blade. One or more structural components, such as spar caps and shear webs, may be positioned within an interior cavity defined by the shell portions. In particular, the structural components engage the shell portions to increase the stiffness, buckling resistance, and/or strength of the rotor blade.

Conventional rotor blades, and more specifically the shell portions, are expensive to manufacture. In particular, conventional shell portions are typically formed by placing a series of layers of an infusible material, such as an infusible glass fiber fabric, in a purpose-built mold. Once sufficient infusible material is laid in the mold to form a shell portion, the structural components may be placed in the mold. The mold is then bagged so that the layers of infusible material forming the shell portion may infused with a suitable resin. After infusion, the rotor blade is cured. The time-consuming nature of this process, and more specifically the infusion process, results in a relatively high cost to produce the shell portions and, in turn, the rotor blades. Furthermore, it is generally necessary to fabricate conventional shell portions in a single facility employing expensive and time-consuming manufacturing processes.

Accordingly, improved wind turbines, and, in particular, improved shell portions for wind turbine rotor blades, are desired in the art. Specifically, shell portions that do not require the use of a time consuming manufacturing process and that are relatively less expensive to manufacture would be advantageous.

BRIEF DESCRIPTION OF THE TECHNOLOGY

Aspects and advantages of the technology will be set forth in part in the following description, or may be obvious from the description, or may be learned through practice of the technology.

In one embodiment, the present disclosure is directed to a method for forming a wind turbine rotor blade. The method includes placing first and second prefabricated skin panels defining a portion of a root section of the wind turbine rotor blade, a pressure side of the wind turbine rotor blade, or a suction side of the wind turbine rotor blade in a mold. The first prefabricated skin panel partially overlaps or is positioned adjacent to the second prefabricated panel to define a connection region. A vacuum bag is placed over the mold. The connection region is infused with a resin.

In another embodiment, the present disclosure is directed to a method for forming a wind turbine rotor blade. The method includes placing first and second prefabricated skin panels defining a portion of a root section of the wind turbine rotor blade, a pressure side of the wind turbine rotor blade, or a suction side of the wind turbine rotor blade in a mold. The first prefabricated skin panel partially overlaps or is positioned adjacent to the second prefabricated skin panel to define a connection region. A dry fiber mat is placed in the connection region and is in contact with the first and second prefabricated skin panels. A vacuum bag is placed over the mold. The connection region is sealed with one or more seals. The connection region is infused with a resin.

In a further embodiment, the present disclosure is directed to a method for forming a wind turbine rotor blade. The method includes forming first and second prefabricated skin panels defining a portion of a root section of the wind turbine rotor blade, a pressure side of the wind turbine rotor blade, or a suction side of the wind turbine rotor blade at one or more remote facilities. The first and second prefabricated skin panels are transported to a central facility. The first and second prefabricated skin panels are placed in a mold. The first prefabricated skin panel partially overlaps or is positioned adjacent to the second prefabricated skin panel to define a connection region. A vacuum bag is placed over the mold. The connection region is infused with a resin.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Figure 1:
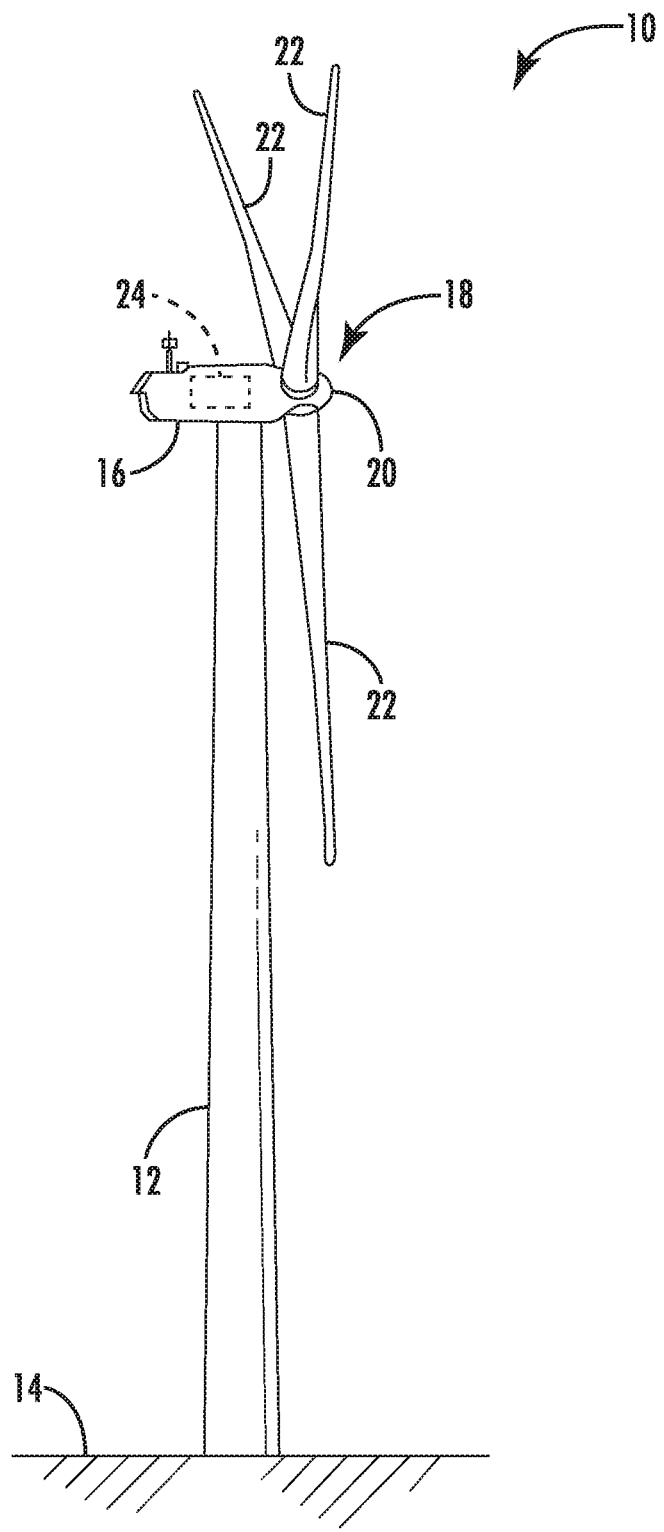
FIG. 1 is a perspective view of an exemplary wind turbine in accordance with embodiments of the present disclosure.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
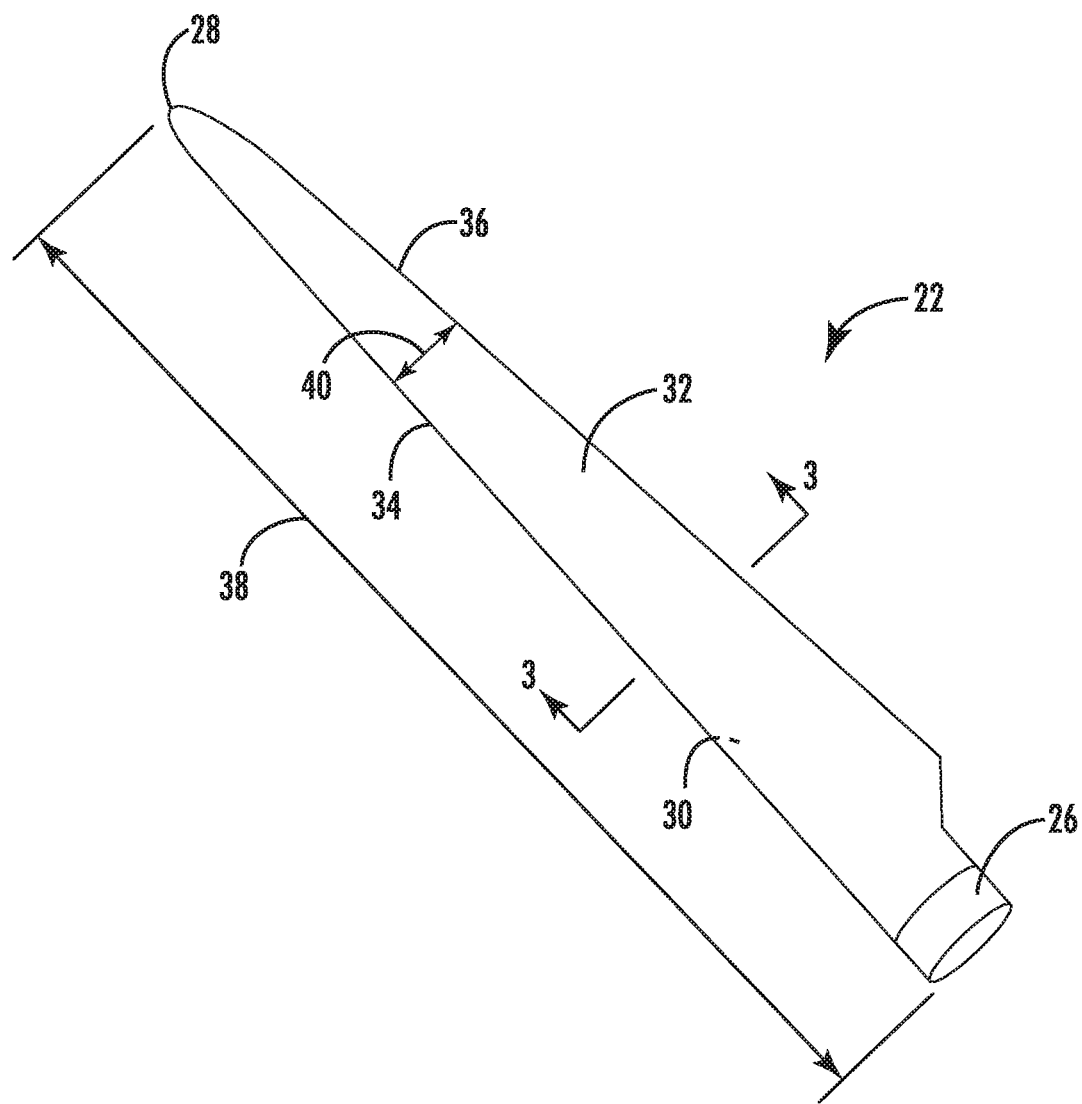
FIG. 2 is a perspective view of an exemplary rotor blade in accordance with embodiments of the present disclosure.

FIG. 2 illustrates a perspective view of one embodiment the rotor blade 22 in accordance with the present disclosure. As shown, the rotor blade 22 includes a blade root 26 that couples to the rotatable hub 20 (FIG. 1) and a blade tip 28 disposed opposite the blade root 26. The rotor blade 22 may also include a pressure side 30 and a suction side 32 extending between a leading edge 34 and a trailing edge 36. Additionally, the rotor blade 22 may include a span 38 defining the total length between the blade root 26 and the blade tip 28 and a chord 40 defining the total length between the leading edge 34 and the trailing edge 36. In general, the chord 40 may vary in length along the span 38 as the rotor blade 22 extends from the blade root 26 to the blade tip 28.

Figure 3:
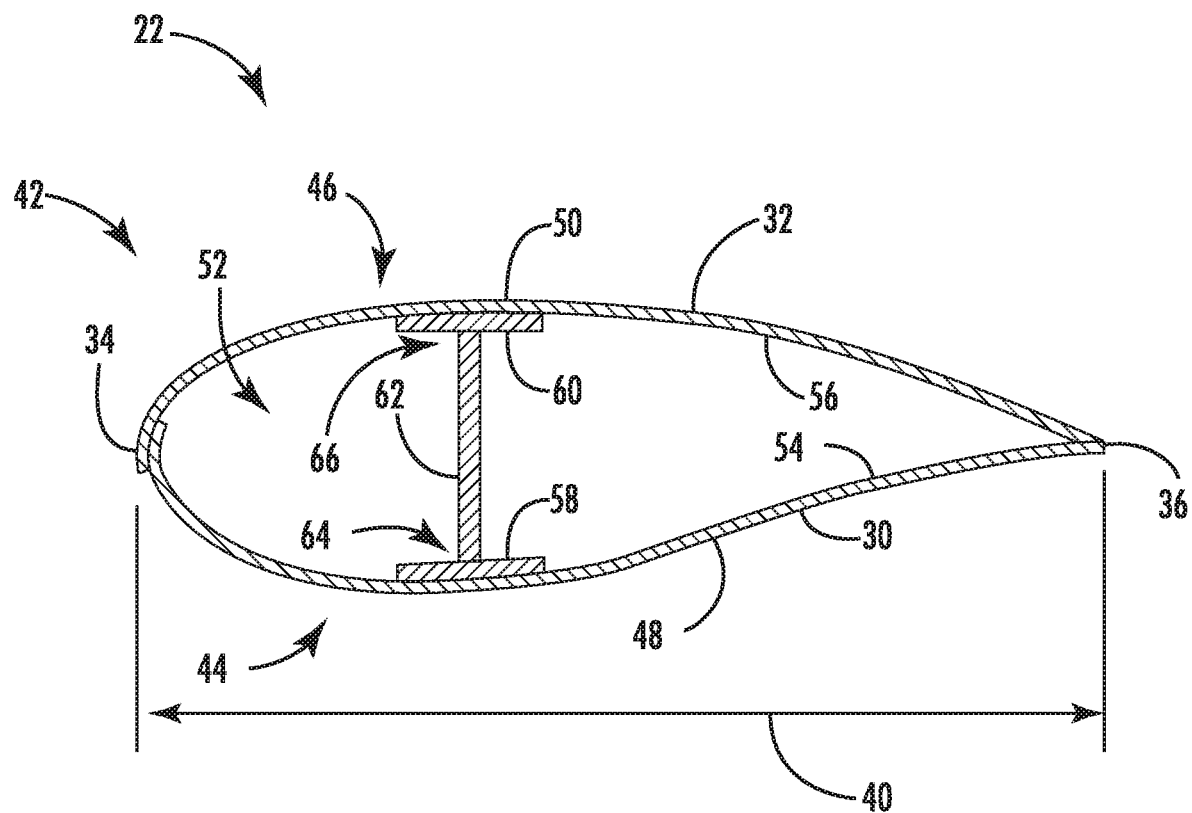
FIG. 3 is a cross-sectional view of the rotor blade taken generally about line 3-3 shown in FIG. 2, illustrating shell portions of the rotor blade in accordance with embodiments of the present disclosure.

Referring now to FIG. 3, the rotor blade 22 may be formed from a shell 42. In some embodiments, the shell 42 includes a first shell portion 44 and a second shell portion 46 coupled (e.g., adhesively coupled) at or proximate to the leading edge 34 and the trailing edge 36 of the rotor blade 22. In this respect, the first and second shell portions 44, 46 may extend along the entire span 38 and/or the entire chord 40. In alternate embodiments, however, the shell 42 may include more or fewer shell portions and/or the shell portions may be joined at different positions on the rotor blade 22. Furthermore, each shell portion may in some embodiments extend for only a portion of the span 38 and/or the chord 40.

As shown in FIG. 3, the shell 42 includes exterior surfaces defining the various sides and edges of the rotor blade 22. More specifically, the first shell portion 44 includes an exterior surface 48 that defines the pressure side 30 of the rotor blade 22. The second shell portion 46 includes an exterior surface 50 that defines the suction side 32 of the rotor blade 22. In the embodiment shown in FIG. 3, the first and second shell portions 44, 46 couple together such that the second shell portion 46 defines the leading edge 34 and/or the first shell portion 44 defines the trailing edge 36. In alternate embodiments, however, the first shell portion 44 may define the leading edge 34, and the second shell portion 46 may define the trailing edge 36. In further embodiments, the first and second shell portions 44, 46 may both define the leading edge 34 and the trailing edge 36.

The shell 42 defines an interior cavity 52 therein. That is, the rotor blade 22 is generally hollow. In the embodiment shown in FIG. 3, the first shell portion 44 defines an interior surface 54 and the second shell portion 46 defines an interior surface 56. In this respect, the interior surfaces 54, 56 of the first and second shell portions 44, 46 circumscribe the interior cavity 52. As will be discussed in greater detail below, various structural components may be positioned in the interior cavity 52.

In the embodiment shown in FIG. 3, the rotor blade 22 includes spar caps 58, 60 positioned in the interior cavity 52. In particular, a first spar cap 58 couples (e.g., adhesively) to the interior surface 54 of the first shell portion 44. A second spar cap 60 couples (e.g., adhesively) to the interior surface 56 of the second shell portion 46. In this respect, the first and second spar caps 58, 60 may generally resist bending stresses and/or other loads acting on the rotor blade 22 in a span-wise direction (i.e., a direction parallel to the span 38 of the rotor blade 22) during operation of a wind turbine 10. Furthermore, the first and second spar caps 58, 60 may resist span-wise compression of the rotor blade 22 occurring during operation of the wind turbine 10. The first and second spar caps 58, 60 may extend along the span 38 from the blade root 26 to the blade tip 28 or a portion thereof. The rotor blade 22 may include zero, one, three, four, or more spar caps 58, 60.

The rotor blade 22 may also include one or more shear webs 62 extending through the interior cavity 52 in the span-wise direction in certain embodiments. Each shear web 62 includes a first side 64 that couples to the first shell portion 44 and a second side 66 that couples to the second shell portion 46. In this respect, the shear webs 62 resist shear forces exerted on the first and second shell portions 44, 46. In the embodiment shown in FIG. 3, rotor blade 22 includes one shear web 62 directly connected (e.g., bonded) to first and second spar caps 58, 60. In alternate embodiments, however, the rotor blade 22 may include more shear webs 62 and/or the shear webs 62 may be directly connected (e.g., bonded) to the interior surfaces 54, 56 of the first and second shell portions 44, 46. In further embodiments, the shear webs 62 may extend in the chord-wise direction (i.e., a direction parallel to the chord 40 of the rotor blade 22).

Figure 4:
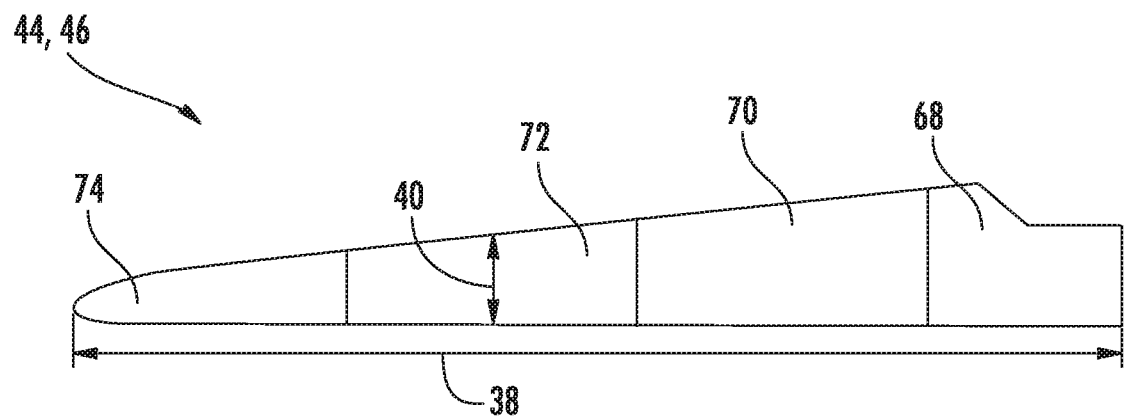
FIG. 4 is a top view of one of the shell portions shown in FIG. 3, illustrating a plurality of prefabricated skin panels in accordance with embodiments of the present disclosure.

Referring now to FIG. 4, the first and/or second shell portions 44, 46 of the rotor blade 22 may be formed from a plurality of prefabricated skin panels ("panels") 68, 70, 72, 74. More specifically, each panel 68, 70, 72, 74 defines a portion of the blade root 26, the pressure side 30, and/or the suction side 32 of the rotor blade 22. Each panel 68, 70, 72, 74 has the desired final dimensions and shape of the corresponding portion of the first or second shell portions 44, 46. Furthermore, each panel 68, 70, 72, 74 is cured or otherwise in a final manufacturing state. That is, all necessary manufacturing operations have been performed to put the panels 68, 70, 72, 74 in a finished state. In this respect, each panel 68, 70, 72, 74 need only be joined to another panel 68, 70, 72, 74 or to some other skin panel to form the finished shell portion 44, 46 of the rotor blade 22.

In the embodiment illustrated in FIG. 4, the shell portions 44, 46 include a first panel 68, a second panel 70, a third panel 72, and a fourth panel 74. As shown, each panel 68, 70, 72, 74 extends for the entirety of the chord 40, but only a portion of the span 38. As such, the panels 68, 70, 72, 74 may be arranged along the span-wise direction. In alternate embodiments, however, the shell portions 44, 46 may include more or fewer panels 68, 70, 72, 74. Additionally, the panels 68 may occupy different portions of the span 38 and/or the chord 40 and/or the panels 68 may be arranged differently form the shell portions 44, 46.

Figure 5:
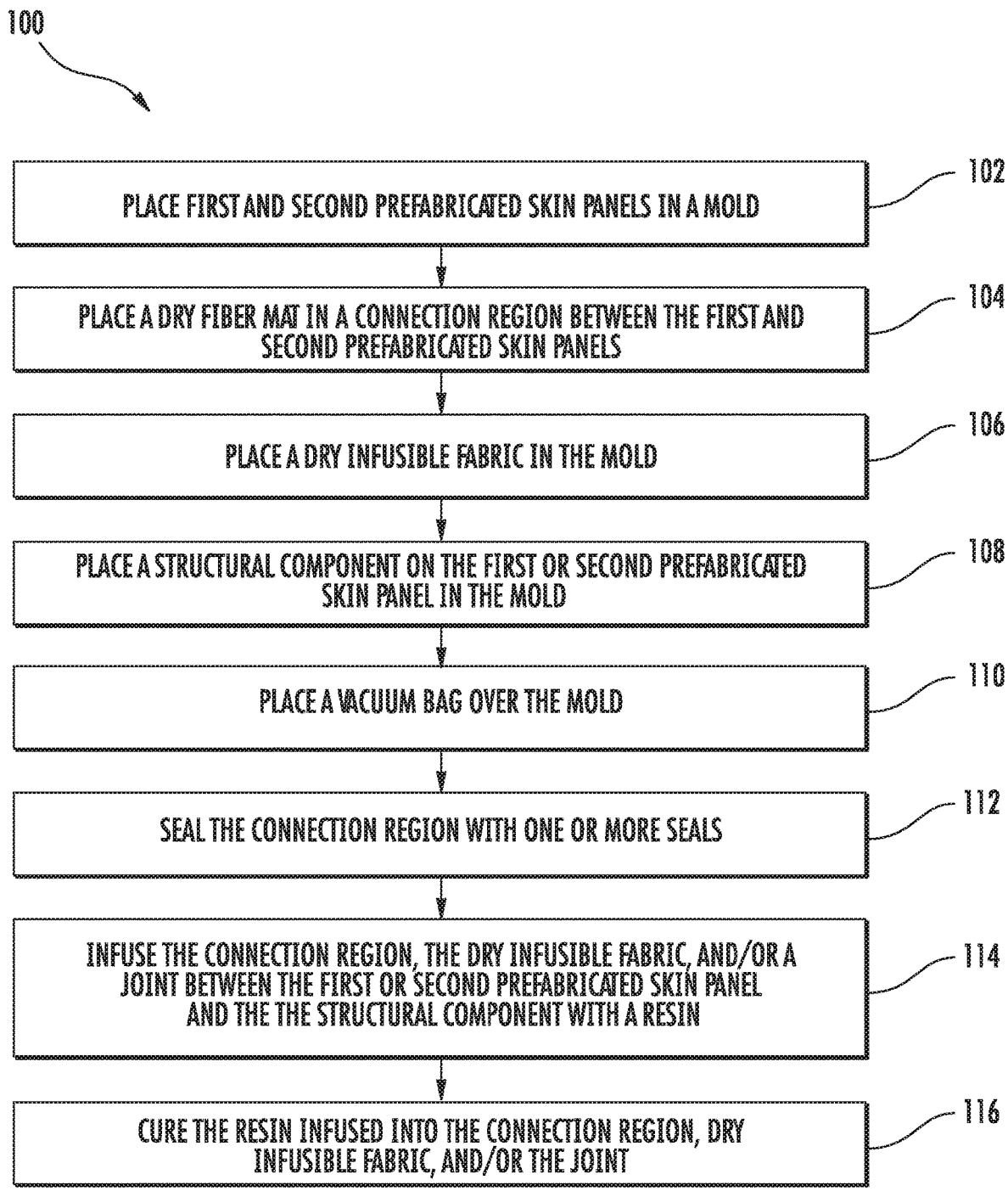
FIG. 5 is a flow chart illustrating an embodiment of a method for forming a rotor blade in accordance with embodiments of the present disclosure.
Figure 6:
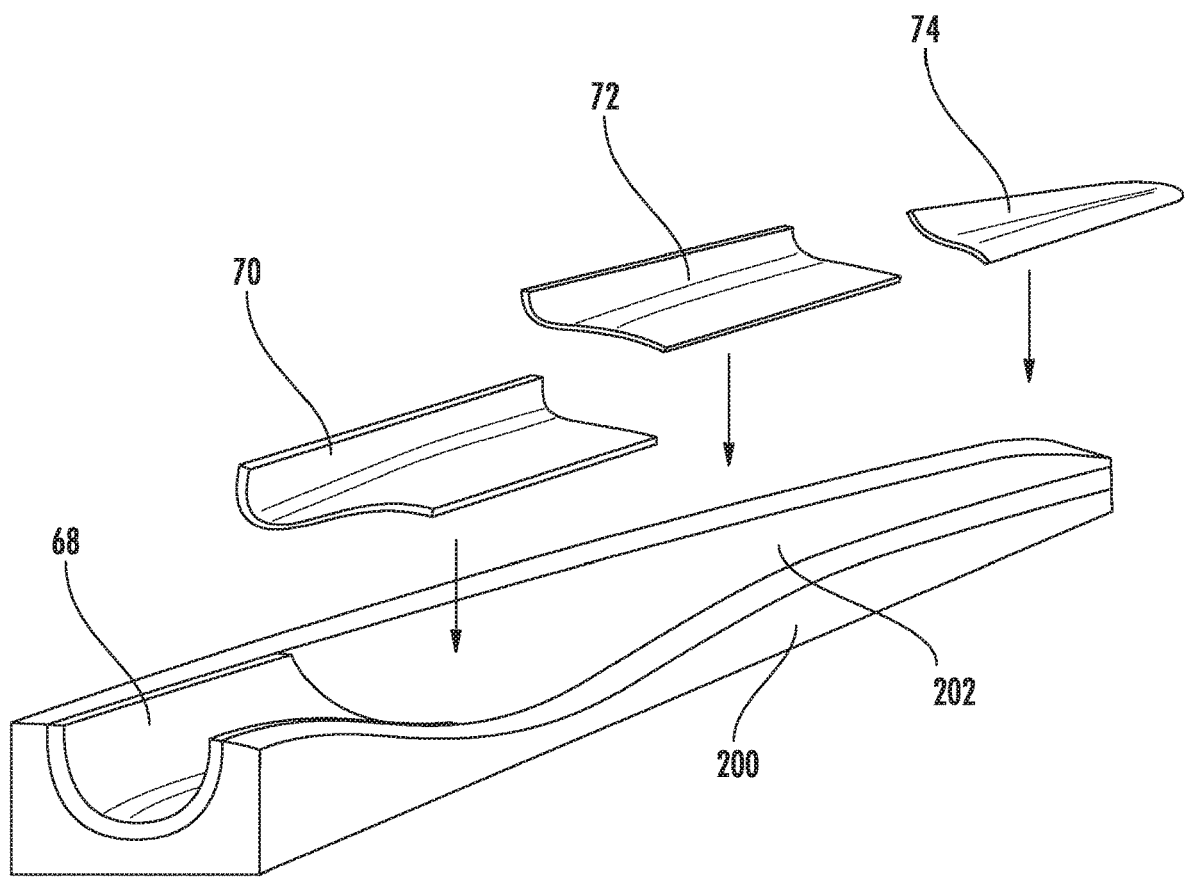
FIG. 6 is a perspective view of placing prefabricated skin panels in a mold in accordance with embodiments of the present disclosure.

FIG. 5 illustrates one embodiment of a method 100 for forming a rotor blade, such as the rotor blade 22, in accordance with the present disclosure. FIGS. 6-12 illustrate various aspects and embodiments of the method 100.

In step 102, the first and second panels 68, 70 are placed in a mold 200. In the embodiment shown in FIG. 6, the first, second, third, and fourth panels 68, 70, 72, 74 are placed on an inner surface 202 of the mold 200. In some embodiments, a release agent, such as a wax, may be applied to a portion of or the entirety of the panels 68, 70, 72, 74 before placement in the mold 200. As shown, the panels 68, 70, 72, 74 may be arranged along the span-wise direction to form the shell portions 44, 46. In alternate embodiments, the panels 68, 70, 72, 74 may be arranged in any suitable manner in the mold 200 to form the first or second shell portions 44, 46 or any portion thereof. Furthermore, more or fewer prefabricated panels 68, 70, 72, 74 may be placed in the mold 200 than shown in FIG. 6.

Each of the panels 68, 70, 72, 74 partially overlaps or is positioned adjacent to one of the other panels 68, 70, 72, 74 to define a connection region 204. In this respect, the first and second panels 68, 70 overlap to define one connection region 204. The second and third panels 70, 72 overlap to define another connection region 204. The third and fourth panels 72, 74 overlap to define a further connection region 204.

Figure 7:
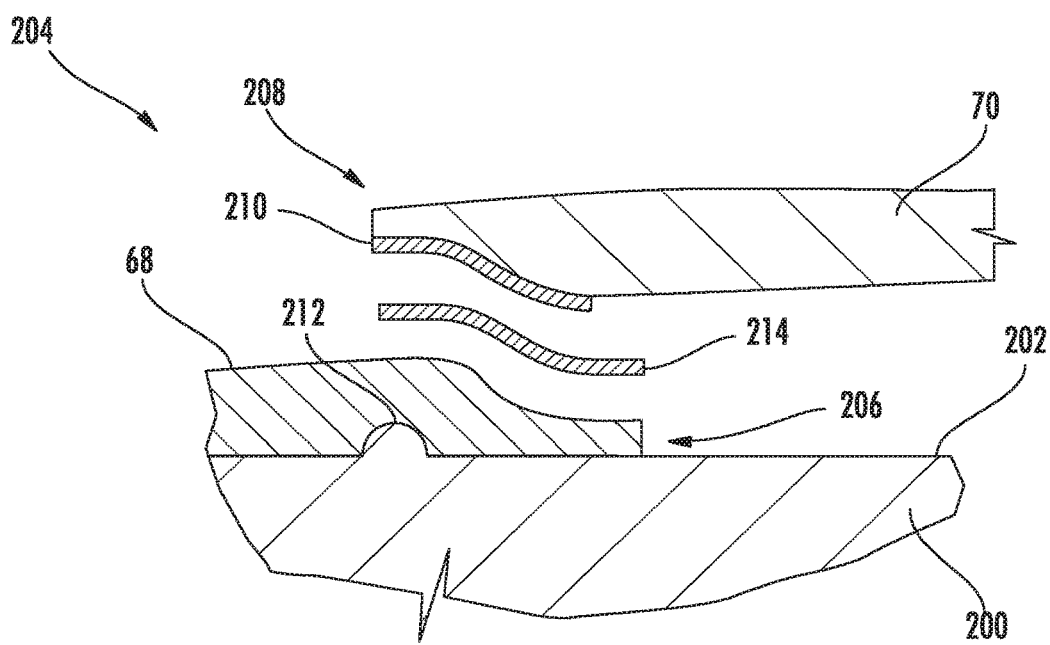
FIG. 7 is a cross-sectional view of one embodiment of a connection region of the first and second prefabricated skin panels in accordance with embodiments of the present disclosure.
Figure 8:
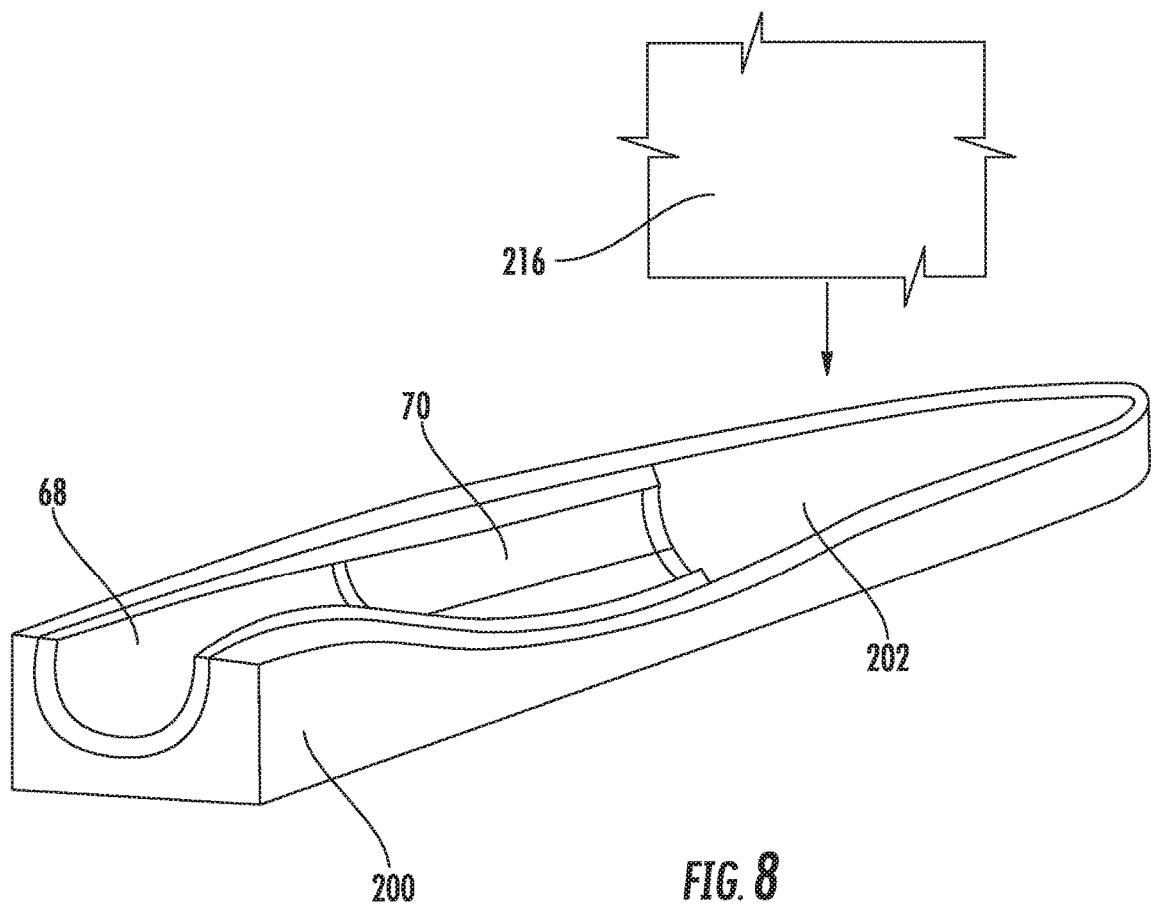
FIG. 8 is a perspective view of placing a dry infusible fabric into the mold in accordance with embodiments of the present disclosure.

FIG. 7 illustrates one embodiment of the connection region 204 between the first and second panels 68, 70. More specifically, a portion of the first panel 68 overlaps a portion of the second panel 70. In this respect, the first and second panels 68, 70 may include features that permit the first and second panels 68, 70 to overlap, while still maintaining the desired thickness of the corresponding shell portion 44, 46. For example, the first and second panels 68, 70 may respectively include complementary narrowing ends 206, 208 as shown in FIG. 7. The ends 206, 208 mate or otherwise couple without increasing thickness of the corresponding shell portion 44, 46. In some embodiments, a peel ply layer 210 may be coupled to the first panel 68, the second panel 70 (as shown in FIG. 7), or both to facilitate mating. In exemplary embodiments, the peel ply layer 210 may be a woven material used to increase the roughness of a surface to facilitate bonding.

Figure 15:
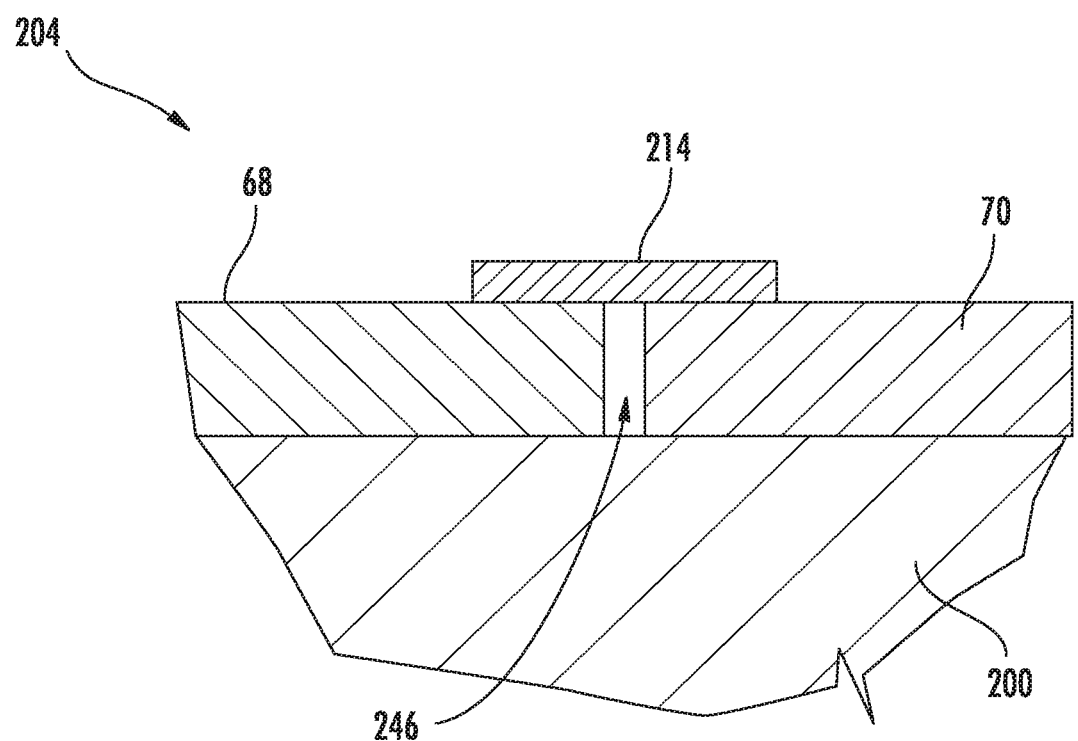
FIG. 15 is a cross-sectional view of another embodiment of the connection region of the first and second prefabricated skin panels in accordance with embodiments of the present disclosure.

FIG. 15 illustrates another embodiment of the connection region 204 between the first and second panels 68, 70. As shown, the first panel 68 is positioned adjacent to the second panel 70. There may be a gap 246 between the first and second panels 68, 70. Alternately, the first panel 68 may be in contact with the second panel 70.

As mentioned above, the panels 68, 70, 72, 74 are placed in the mold 200. In particular, the mold 200 may be any mold configured for forming the shell portions 44, 46 using conventional methods. Specifically, the mold 200 may be configured to receive dry infusible material, such a fiber reinforced fabric, which is then infused with a resin (e.g., a thermoplastic or thermoset resin) and cured to form one of the shell portions 44, 46. Furthermore, the mold 200 is preferably a single, integrally formed component. In alternate embodiments, however, the mold 200 may be formed in any suitable manner.

Referring again to FIG. 7, some embodiments of the mold 200 may include one or more locating features 212. More specifically, the locating features 212 may be used to position one or more of the panels 68, 70, 72, 74 on the inner surface 202 of the mold 200. In this respect, the locating features 212 may be bumps (as shown in FIG. 7), pins, tabs, or any other suitable feature extending outward from an inner surface 202 of the mold 200.

In step 104, a dry fiber mat 214 or other dry infusible material is placed in the connection region 204. The dry fiber mat 214 has not yet been infused with or otherwise exposed to resin. In the embodiment shown in FIG. 7, the fiber mat 214 may be placed in the connection region 204 between the ends 206, 208 of the first and second panels 68, 70. In the embodiment shown in FIG. 15, the fiber mat 214 may be placed on top of the first and second panels 68, 70 to bridge the gap 246. The fiber mat 214 may also be placed on underneath the first and second panels 68, 70 on the inner surface 202 of the mold 200. The dry fiber mat 214 may be placed in the connection region 204 of any adjacent pair of the panels 68, 70, 72, 74 in other embodiments. As will be discussed in greater detail below, the fiber mat 214 may improve bonding between the panels 68, 70, 72, 74. Some embodiments of the method 100 may not include step 104.

A dry infusible fabric 216 is placed in the mold 200 in step 106. More specifically, the panels 68, 70, 72, 74 may only form part of the shell portions 44, 46 in certain embodiments. In this respect, the dry infusible fabric 216 may be used to form the remaining parts of the shell portions 44, 46. In particular, the dry infusible fabric 216 partially overlaps the adjacent prefabricated skin panels 68, 70, 72, 74. In the embodiment shown in FIG. 8, the first and second prefabricated skin panels 68, 70 form part of the shell portions 44, 46. The remainder of the shell portions 44, 46 is formed by placing the dry infusible fabric 216 into the mold 200 such that the dry infusible fabric 216 partially overlaps the second prefabricated skin panel 70. The dry infusible fabric 216 has not yet been infused with or otherwise exposed to resin. Some embodiments of the method 100 may not include step 106.

Figure 9:
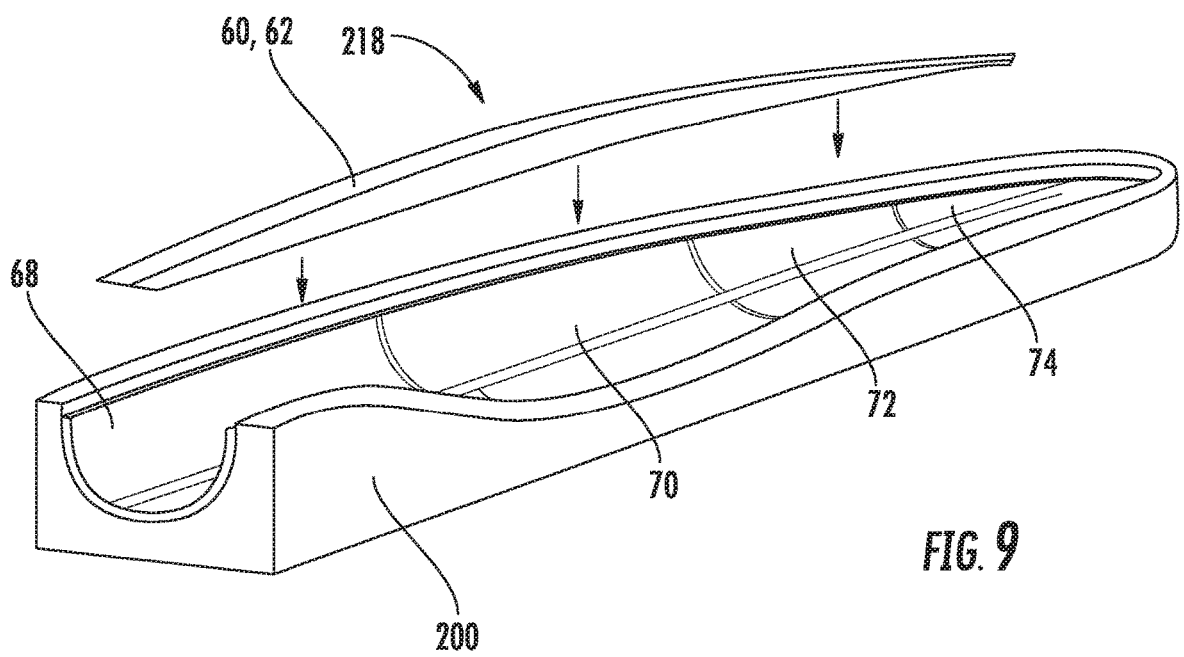
FIG. 9 is a perspective view of placing a structural component in the mold in accordance with embodiments of the present disclosure.

In step 108, a structural component 218 is placed on the first or second panels 68, 70. Referring now to FIG. 9, the rotor blade 22 may include one or more structural components 218, which may be the spar caps 60, 62 (FIG. 3), the shear web 62 (FIG. 3), a trailing edge reinforcement 220 (FIG. 10), or any other suitable structural member. The structural components 218 may couple to one or both of the shell portions 44, 46. In this respect, the structural components 218 may be placed on the particular panels 68, 70, 72, 74 in the mold 200 that correspond to the part of the shell portions 44, 46 to which the structural components 218 couple. In the embodiment shown in FIG. 9, for example, one of the spar caps 60, 62 is placed onto of the panels 68, 70, 72, 74 positioned in the mold 200. The structural component 218 may be prefabricated. Some embodiments of the method 100 may not include step 108.

Figure 10:
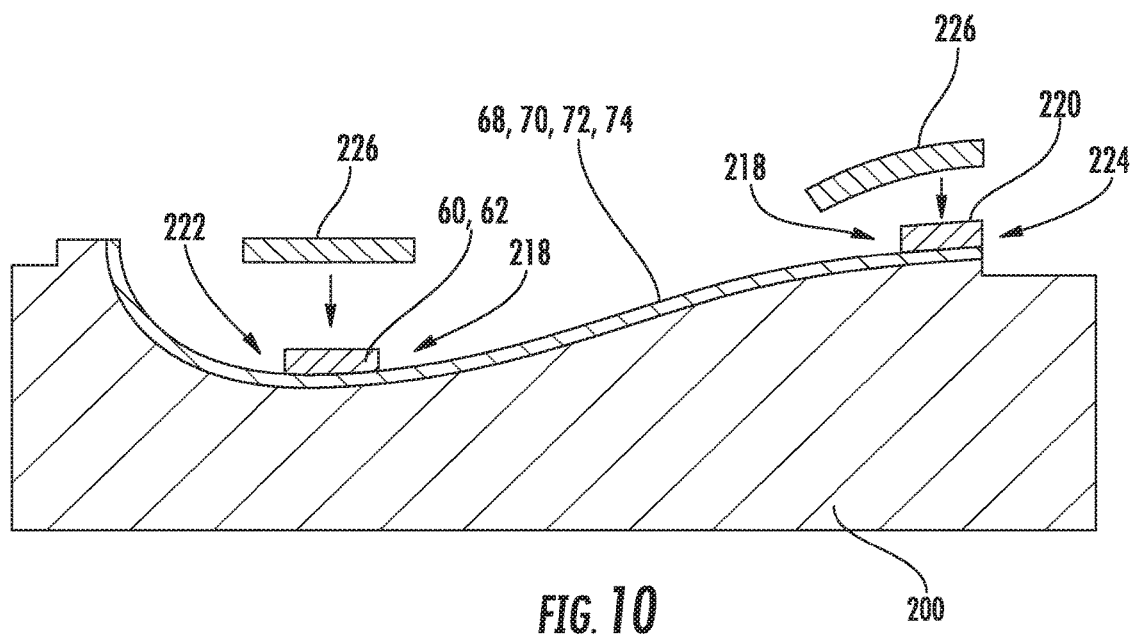
FIG. 10 is a cross-sectional view of the structural member after placement in the mold in accordance with embodiments of the present disclosure.

Referring to FIG. 10, each structural component 218 and the corresponding panel 68, 70, 72, 74 define a joint 222, 224 therebetween. As shown, the spar cap 60, 62 and the panels 68, 70, 72, 74 define a first joint 222 therebetween. Similarly, the trailing edge reinforcement 220 and the panels 68, 70, 72, 74 define a second joint 224 therebetween. In certain embodiments, dry infusible fabric 226 may be placed over the structural components 218 as shown in FIG. 10.

Figure 11:
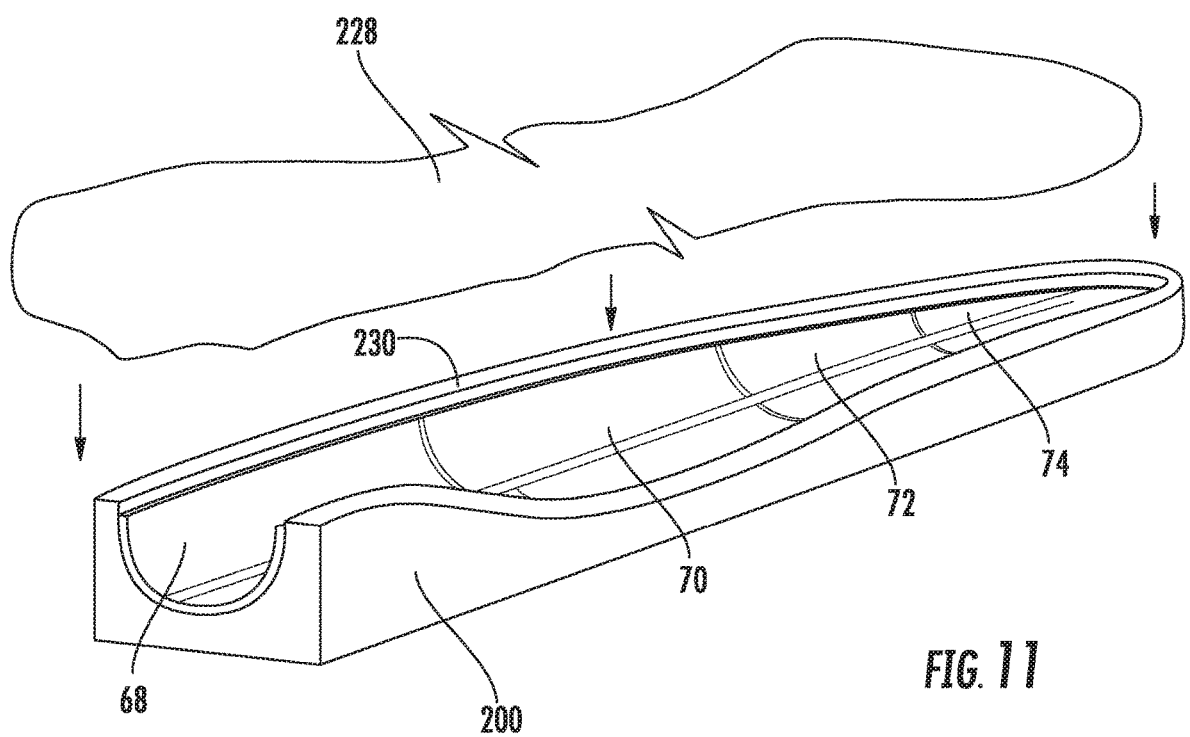
FIG. 11 is a perspective view of placing a vacuum bag over the mold in accordance with embodiments of the present disclosure.
Figure 12:
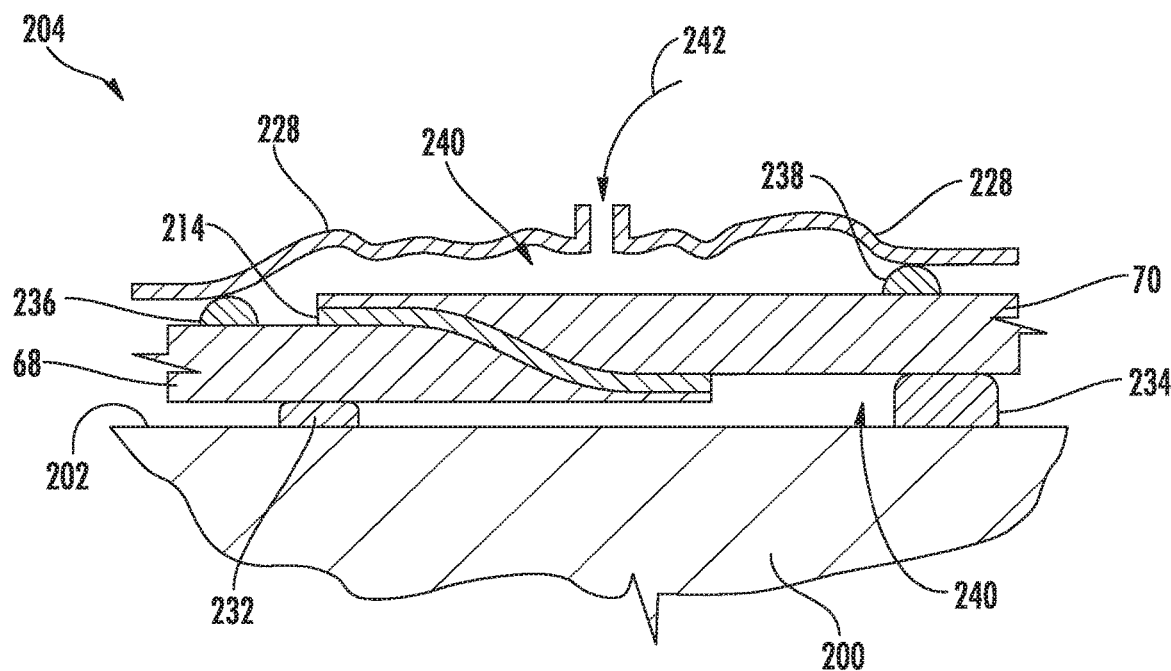
FIG. 12 is a perspective view of sealing the connection region in accordance with embodiments of the present disclosure.

In step 110, a vacuum bag 228 is placed over the mold 200. More specifically, as shown in FIG. 11, the vacuum bag 228 may be placed over the entirety of the mold 200 and attached (e.g., adhesively attached) to a top surface 230 of the mold 200. In alternate embodiments, the vacuum bag 228 may be placed over only a portion of the mold 200 and/or may be attached to any suitable portion of the mold 200 in any suitable manner.

In step 112, the connection regions 204 may be sealed with one or more seals 232, 234, 236, 238. In the embodiment shown in FIG. 12, the connection region 204 is sealed with four seals 232, 234, 236, 238. More specifically, the seal 232 seals between the inner surface 202 of the mold 200 and the bottom surface of the first panel 68. Similarly, the seal 234 seals between the inner surface 202 of the mold 200 and the bottom surface of the second panel 70. In some embodiments, the seals 234, 236 are formed from an elastomeric material and coupled to the inner surface 202 of the mold 200. The seals 236, 238 respectively couple the vacuum bag 228 to the top surface of the first and second panels 68, 70. The seals 236, 238 may be a tape or other adhesive is certain embodiments. As shown, the first and second prefabricated panels 68, 70; the mold 200; the vacuum bag 118; and the seals 232, 234, 236, 238 collectively define an infusion chamber 240. In certain embodiments, the joint 222, 224 and areas of dry infusible fabric 216, 226 may also be sealed in accordance with step 212.

In step 114, the connection regions 204, and, if included, the dry infusible fabric 216, 226 and/or the joints 222, 224, are infused with a resin 242. In the embodiment shown in FIG. 12, the resin 242 is pumped into the infusion chamber 240 via a port 244 in the vacuum bag 228 to infuse the connection region 204 positioned therein. In some embodiment, each connection region 204; joint 222, 224; and area of dry infusible fabric 216, 226 may be separately infused. In such embodiments, the connection regions 204; the joints 222, 224; and/or the areas of dry infusible fabric 216, 226 are sealed in accordance with step 112. As such, the seals 232, 234, 236, 238 prevent the resin 242 escaping the infusion chamber 240. In alternate embodiments, however, the entire shell portion 44, 46 may infused. In such embodiments, none of the connection regions 204; the joints 222, 224; or the areas of dry infusible fabric 216, 226 is sealed in accordance with step 112.

The resin 242 infused into the connection region 204; the dry infusible fabric 216, 226; and/or the joints 222, 224 is cured step 116. Upon completion of step 116, the panels 68, 70, 72, 74 are bonded together to form the first or second shell portion 44, 46.

Figure 13:
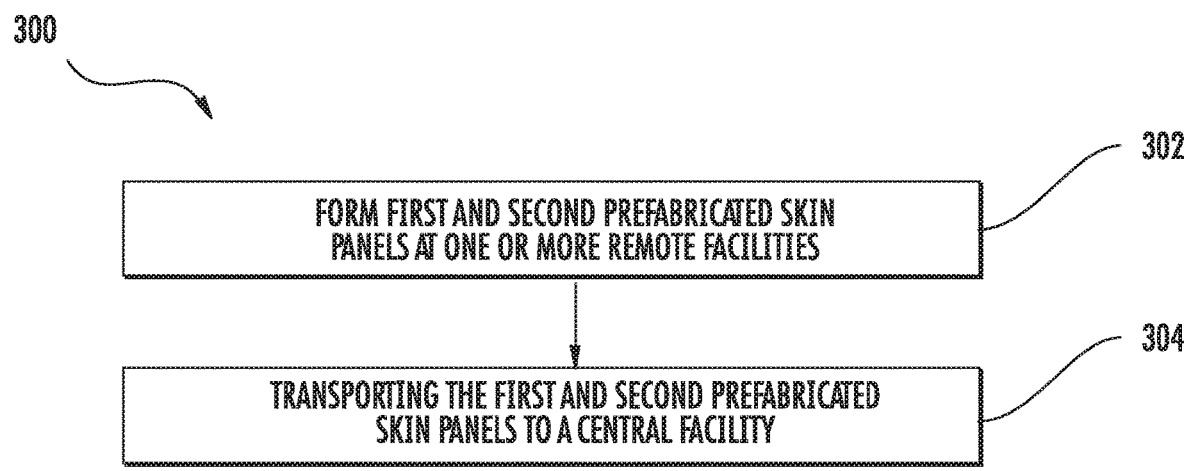
FIG. 13 is a flow chart illustrating an another embodiment of a method for forming a rotor blade in accordance with embodiments of the present disclosure.
Figure 14:
FIG. 14 is a schematic view illustrating the method shown in FIG. 13 in accordance with embodiments of the present disclosure.

FIG. 13 illustrates one embodiment of a method 300 for forming a rotor blade, such as the rotor blade 22, in accordance with the present disclosure. FIG. 14 illustrates various aspects of the method 300. More specifically, in step 302, the panels 68, 70, 72, 74 are formed at one or more remote facilities 400. The panels 68, 70, 72, 74 are transported to a central facility 402 in step 304. Upon completion of step 304, steps 102-116 of method 100 may be performed. The central facility 402 is located at a different geographic location, such as a different city, state, or country, than the remote facilities 400. In certain embodiments, the central facility 402 may generally have a greater level of sophistication (e.g., in terms of personnel, equipment, processes, knowledge, etc.) than the remote facilities 400.

The skin panels 68, 70, 72, 74 may be formed from any suitable material in step 302. For example, the prefabricated skin panels 68, 70, 72, 74 may be formed from a resin-based polymer and a plurality of reinforcing fibers. In some embodiments, all of the panels 68, 70, 72, 74 may be formed from the same material. In alternate embodiments, some of the panels 68, 70, 72, 74 may be formed from the different materials, such as different resin-based polymers and/or different reinforcing fibers. For example, the panels 68, 70, 72, 74 positioned at the blade root 26 are subjected to greater loads than the panels 68, 70, 72, 74 positioned at the blade tip 28. In this respect, the panels 68, 70, 72, 74 positioned at the blade root 26 may be formed from a stronger material (e.g., epoxy- or polyurethane-based material) than the panels 68, 70, 72, 74 positioned at the blade tip 28 (e.g., polyester-based material). Furthermore, the resins used to couple the panels 68, 70, 72, 74 in the infusion process (e.g., step 114) may be different than the resin used in forming the panels 68, 70, 72, 74 (e.g., step 302).

The shells portions 44, 46 of the rotor blade 22 may be formed from prefabricated panels 68, 70, 72, 74 using methods 100 and/or 300. As discussed in greater detail above, the panels 68, 70, 72, 74 are in a finished state and only require coupling to other panels 68, 70, 72, 74 to form the completed shell portion 44, 46. In this respect, the time necessary for and the cost associated with forming the shell portions 44, 46 using methods 100 and/or 300 is reduced compared to conventional manufacturing methods. As such, the cost of the rotor blade 22 using methods 100 and 300 is reduced compared to conventional methods. In some embodiments, only the connection regions 204 are infused. This reduces the necessary infusion time and, accordingly, the cost of forming the shell portions 44, 46. In certain embodiments, the panels 68, 70, 72, 74 may be formed at the remote facilities 400, which may have a lower production cost than the central facility 402, to further reduce the cost of the rotor blade 22.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for forming a wind turbine rotor blade, the method comprising:
   placing first and second prefabricated skin panels defining a portion of a root section of the wind turbine rotor blade, a pressure side of the wind turbine rotor blade, or a suction side of the wind turbine rotor blade in a mold, wherein the first prefabricated skin panel partially overlaps or is positioned adjacent to the second prefabricated panel to define a connection region;
   placing a vacuum bag over an entirety of the mold;
   sealing the connection region with a first seal positioned between the first prefabricated skin panel and the vacuum bag and a second seal positioned between the second prefabricated skin panel and the vacuum bag such that the first seal, the second seal, and a first portion of the vacuum bag define an infusion zone around the connection region, wherein the first seal separates a first portion of the first prefabricated skin panel positioned within the infusion zone and a second portion of the first prefabricated skin panel positioned outside of the infusion zone, the first seal further separating the first portion of the vacuum bag and a second portion of the vacuum bag positioned outside of the infusion zone; and
   infusing the connection region with a resin such that the first portion of the prefabricated panel is infused with the resin,
   wherein the first seal prevents the resin from flowing from the infusion zone to the second portion of the prefabricated panel such that only the connection region is infused.

2. The method of claim 1, further comprising:
   placing a dry fiber mat in the connection region between the first and second prefabricated skin panels before infusing the connection region with the resin.

3. The method of claim 1, further comprising:
   curing the resin infused into the connection region.

4. The method of claim 1, further comprising:
   placing a structural component on the first or second prefabricated skin panel in the mold, wherein the first or second prefabricated skin panel and the structural component defines a joint therebetween.

5. The method of claim 4, further comprising:
   infusing the joint with the resin.

6. The method of claim 1, further comprising:
   attaching one or more peel ply layers to the first or second prefabricated skin panels in the connection region.

7. The method of claim 1, further comprising:
   aligning the first or second prefabricated skin panels with one or more locating features in the mold.

8. The method of claim 1, further comprising:
   applying a release agent to a portion of the first or second prefabricated skin panels before placing the first and second prefabricated skin panels in the mold.

9. The method of claim 1, further comprising:
   placing a dry infusible fabric in the mold, the dry infusible fabric partially overlapping the first or second prefabricated skin panel; and
   infusing the dry infusible fabric with the resin.

10. The method of claim 1, further comprising:
    forming the first and second prefabricated skin panels from a resin-based polymer and a plurality of reinforcing fibers.

11. The method of claim 10, wherein the first and second prefabricated skin panels are formed from different resin-based polymers or a different plurality of reinforcing fibers.

12. The method of claim 10, wherein infusing of the connection region with the resin comprises infusing the connection region with a different resin than the resin of the cured fiber reinforced resin-based polymer of the first and second prefabricated skin panels.

13. A method for forming a wind turbine rotor blade, the method comprising:
    placing first and second prefabricated skin panels defining a portion of a root section of the wind turbine rotor blade, a pressure side of the wind turbine rotor blade, or a suction side of the wind turbine rotor blade in a mold, wherein the first prefabricated skin panel partially overlaps or is positioned adjacent to the second prefabricated skin panel to define a connection region;
    placing a dry fiber mat in the connection region, the dry fiber mat being in contact with the first and second prefabricated skin panels;
    placing a vacuum bag over an entirety of the mold;
    sealing the connection region with a first seal positioned between the first prefabricated skin panel and the vacuum bag and a second seal positioned between the second prefabricated skin panel and the vacuum bag such that the first seal, the second seal, and a first portion of the vacuum bag define an infusion zone around the connection region, wherein the first seal separates a first portion of the first prefabricated skin panel positioned within the infusion zone and a second portion of the first prefabricated skin panel positioned outside of the infusion zone, the first seal further separating the first portion of the vacuum bag and a second portion of the vacuum bag positioned outside of the infusion zone; and
    infusing the connection region with a resin such that the first portion of the prefabricated panel is infused with the resin,
    wherein the first seal prevents the resin from flowing from the infusion zone to the second portion of the prefabricated panel such that only the connection region is infused.

14. The method of claim 13, further comprising:
    curing the resin infused into the connection region.

15. The method claim 13, further comprising:
    placing a structural component on the first or second prefabricated skin panel in the mold,
    wherein the first or second prefabricated skin panel and the structural component defines a joint therebetween; and
    infusing the joint with the resin.

16. The method of claim 13, further comprising:
    applying a release agent to a portion of the first or second prefabricated skin panels before placing the first and second prefabricated skin panels in the mold; and
    aligning the first or second prefabricated skin panels with one or more locating features in the mold.

17. The method of claim 13, further comprising:
forming the first and second prefabricated skin panels from a resin-based polymer and a plurality of reinforcing fibers.

18. The method of claim 17, wherein the first and second prefabricated skin panels are formed from different resin-based polymers or a different plurality of reinforcing fibers.

19. A method for forming a wind turbine rotor blade, the method comprising:
forming first and second prefabricated skin panels defining a portion of a root section of the wind turbine rotor blade, a pressure side of the wind turbine rotor blade, or a suction side of the wind turbine rotor blade at one or more remote facilities;
transporting the first and second prefabricated skin panels to a central facility;
placing the first and second prefabricated skin panels in a mold, wherein the first prefabricated skin panel partially overlaps or is positioned adjacent to the second prefabricated skin panel to define a connection region;
placing a vacuum bag over an entirety of the mold;
sealing the connection region with a first seal positioned between the first prefabricated skin panel and the vacuum bag and a second seal positioned between the second prefabricated skin panel and the vacuum bag such that the first seal, the second seal, and a first portion of the vacuum bag define an infusion zone around the connection region, wherein the first seal separates a first portion of the first prefabricated skin panel positioned within the infusion zone and a second portion of the first prefabricated skin panel positioned outside of the infusion zone, the first seal further separating the first portion of the vacuum bag and a second portion of the vacuum bag positioned outside of the infusion zone; and
infusing the connection region with a resin such that the first portion of the prefabricated panel is infused with the resin,
wherein the first seal prevents the resin from flowing from the infusion zone to the second portion of the prefabricated panel such that only the connection region is infused.

* * * * *